H. E. BESTER.
VIBRATOR.
APPLICATION FILED APR. 15, 1918.
1,296,741.
Patented Mar. 11, 1919.
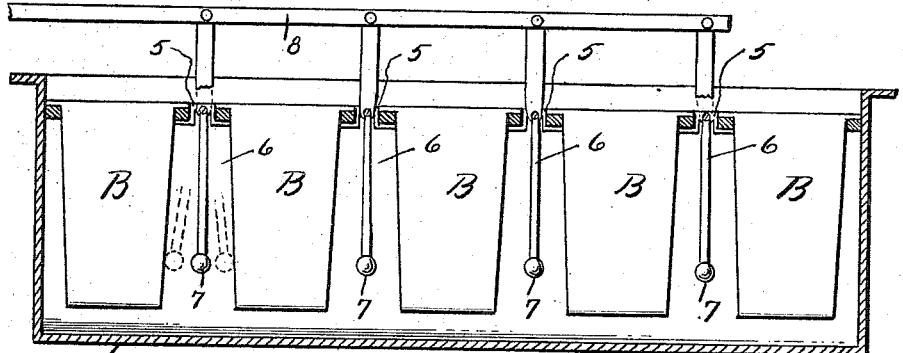
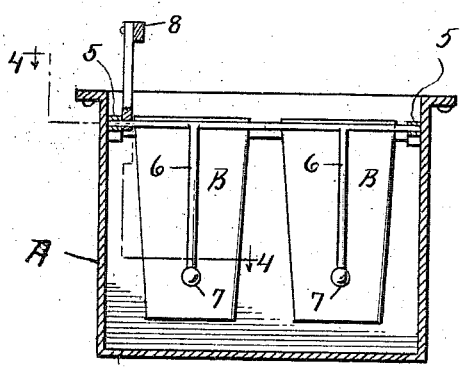
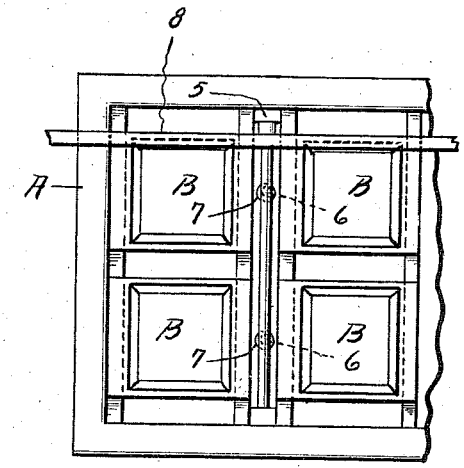
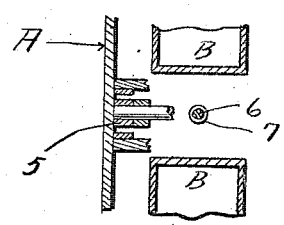
Inventor
H. E. Bester

UNITED STATES PATENT OFFICE.

HARRY E. BESTER, OF HAGERSTOWN, MARYLAND.

VIBRATOR.

1,296,741.  Specification of Letters Patent.  Patented Mar. 11, 1919.

Application filed April 15, 1918. Serial No. 228,681.

*To all whom it may concern:*

Be it known that I, HARRY E. BESTER, a citizen of the United States, residing at Hagerstown, in the county of Washington, State of Maryland, have invented certain new and useful Improvements in Vibrators; and I do hereby declare the following to be a full, clear, and exact description of the invention, such as will enable others skilled in the art to which it appertains to make and use the same.

The invention relates to a liquid freezing apparatus, and more particularly to the class of vibrator attachments for use in the manufacture of freezing liquids.

The primary object of the invention is the provision of a vibrator of this character wherein the oscillating motion thereof effects a tapping upon the container for the liquid to be frozen so as to keep the contents of said container in a constant state of agitation during the process of freezing, thereby causing the air in the liquid to escape with the resultant rapid congealing of the liquid without the presence of frozen scales or white or opaque cakes of ice which is objectionable in ice cream or the like.

Another object of the invention is the provision of a vibrator of this character wherein the action thereof causes all air in the liquid to rise to the surface and the liquid to freeze uniformly, the vibrator being of novel form and is readily installed in an apparatus for freezing liquids.

A further object of the invention is the provision of a vibrator of this character which is extremely simple in its construction, thoroughly reliable and efficient in operation, and inexpensive to manufacture.

The invention will be best understood from a consideration of the following detailed description, taken in connection with the accompanying drawing forming part of this specification, with the further understanding that while the drawing shows a practical form of the invention, the latter is not confined to any strict conformity with the showing of the drawing, but may be changed and modified so long as such changes and modifications come within the scope of the appended claims.

In the accompanying drawing:—

Figure 1 is a vertical sectional elevation of a liquid freezing apparatus showing the vibrator attachment constructed in accordance with the invention applied, one of the vibrators being shown by full lines in one position, and by dotted lines in other positions.

Fig. 2 is a fragmentary vertical transverse sectional view;

Fig. 3 is a fragmentary top plan view;

Fig. 4 is a sectional view on the line 4—4 looking in the direction of the arrow.

Similar reference characters indicate corresponding parts throughout the several views in the drawing.

Referring to the drawing in detail, A designates generally a portion of a tank adapted for containing a noncongealable liquid capable of being circulated therein, the tank being of any approved construction and removably suspended therein is one or more receptacles or cans B adapted for containing liquid to be frozen, for example, ice cream. The receptacles or cans B are vertically supported in any suitable manner rigidly within the tank and are preferably slightly elevated above the bottom thereof so that the liquid of noncongealable form may freely circulate about the same for the freezing of the contents thereof.

Mounted at the top or near the same in the tank A between adjacent receptacles or cans B is a fulcrum or trunnion bearing 5 preferably of the form shown in Figs. 1 and 2 of the drawing, the bearing being designed to support a vibrator hereinafter fully described.

The vibrator comprises a pendulum or oscillatory rod 6 which extends downwardly between the receptacles or cans B and may be of any desirable length, the lower end of said pendulum or rod 6 being formed with a hammer or striking head 7 which on the oscillation of said pendulum or rod strikes alternately the sides of the receptacles or cans B for effecting a constant agitation of the contents thereof while freezing, with the result that air in the liquid contained within said receptacles or cans B will escape to the surface and the liquid will be caused to congeal very rapidly, thereby eliminating the white or opaque cakes of ice within the frozen liquid such as ice cream, which is very objectionable.

The pendulum or rods 6 extend upwardly beyond the top of the tank A and are pivotally connected to a master or connecting rod 8 which is reciprocated from any suitable source of motive power, thereby causing the pendulum or rod 6 in series to oscillate for the tapping operation thereof.

From the foregoing it is thought that the construction and manner of operation of the vibrator will be clearly understood, and therefore a more extended explanation has been omitted.

What is claimed is:

1. In an ice manufacturing apparatus, the combination with a liquid container, of a tapping device constructed and arranged to tap the container and establish molecular vibration without bodily displacing the container, for inducing trembling of the contained water.

2. In an ice manufacturing apparatus, the combination with a plurality of water containers, of a tapping device disposed between the containers and arranged to tap them alternately to impart molecular vibration without bodily displacing the containers, for inducing trembling of the contained water.

3. The combination with a tank having supports arranged therein, of a plurality of liquid receptacles removably held within the supports interiorly of the tank and adapted to contain liquid to be frozen, a shaft journaled in the supports between the receptacles, pendulum arms on said shaft and depending between the receptacles, each arm being of less length than the receptacles, striking heads on the free ends of the arms for alternately tapping the pairs of receptacles opposite each other, and means for rocking the shafts in unison with each other.

4. The method of releasing air bubbles from the inner face of a container for liquid to be frozen in an ice manufacturing apparatus, which consists in contributing molecular vibration to the wall of the container, with consequent trembling of the contained liquid and without bodily movement of the container.

In testimony whereof, I affix my signature, in the presence of two witnesses.

HARRY E. BESTER.

Witnesses:
HARRY L. LONG,
JOHN H. MARSHALL.

Copies of this patent may be obtained for five cents each, by addressing the "Commissioner of Patents, Washington, D. C."